United States Patent [19]

Ouwerkerk et al.

[11] Patent Number: 4,926,411
[45] Date of Patent: May 15, 1990

[54] CASSETTE HAVING AN INFORMATION DISC

[75] Inventors: Cornelis Ouwerkerk; Cornelis Beijersbergen Van Henegouwen, both of Eindhoven, Netherlands

[73] Assignee: U.S. Philips Corporation, New York, N.Y.

[21] Appl. No.: 318,219

[22] Filed: Mar. 2, 1989

[30] Foreign Application Priority Data

Sep. 5, 1988 [NL] Netherlands ............... 8802185

[51] Int. Cl.⁵ .............. G11B 23/02; G11B 5/12
[52] U.S. Cl. .................... 369/291; 206/309; 206/444; 360/133
[58] Field of Search ............ 369/291; 360/133; 206/306, 309, 311, 372, 444

[56] References Cited

U.S. PATENT DOCUMENTS

| 3,062,552 | 11/1962 | Schwarz. | |
|---|---|---|---|
| 3,593,327 | 7/1971 | Shill | 340/174.1 |
| 4,159,494 | 6/1979 | Evans et al. | 360/133 |
| 4,403,316 | 9/1983 | van de Veerdonk | 369/44 |
| 4,613,044 | 9/1986 | Saito et al. | 206/444 |
| 4,688,206 | 8/1987 | Nakagawa et al. | 206/444 |
| 4,777,631 | 10/1988 | Kamoshita et al. | 369/77.2 |

FOREIGN PATENT DOCUMENTS

| 0042062 | 12/1981 | European Pat. Off. . | |
| 0146656 | 7/1985 | European Pat. Off. . | |
| 0255185 | 2/1988 | European Pat. Off. . | |
| 2644894 | 4/1978 | Fed. Rep. of Germany . | |
| 143491 | 7/1985 | Japan | 360/133 |
| 2101794 | 1/1983 | United Kingdom | 360/133 |
| 2173631 | 10/1986 | United Kingdom . | |

OTHER PUBLICATIONS

Dutch search report.

Primary Examiner—Steven L. Stephan
Attorney, Agent, or Firm—Leroy Eason; John Francis Moran

[57] ABSTRACT

A cassette contains an information disc arranged to be rotatable in the space inside the cassette and has an opening in a main wall of the housing to provide access to the disc surface for a pick-up. In order to minimize the area of the opening, while maintaining a wide field of use for the cassette, the opening is arranged asymmetrically relative to a radius of the disc.

13 Claims, 3 Drawing Sheets

CASSETTE HAVING AN INFORMATION DISC

FIELD OF THE INVENTION

The invention relates to a cassette, comprising a rotatable information disc having information readable by means of a pick-up which moves parallel to the disc surface and which forms part of a read apparatus. A housing is provided having first and second main walls parallel to the disc, side walls, a front wall and a rear wall, which walls together bound a disc-receiving space in which the disc is located so as to be rotatable. The first main wall is formed with a first opening to give the pick-up access to the disc surface.

Cassettes of this type are employed, for example, in conjunction with a magnetic disc or an optical disc for the storage of computer data. Alternatively, the disc may carry audio and/or video information. The housing of the cassette affords protection for the disc accommodated in it. Cassettes of this type are very suitable for professional uses or in environments in which a careful treatment of the disc is not readily possible, such as in cars.

PRIOR ART

Cassettes of the type defined in the opening paragraph are known, for example from European Patent Application 0,255,185 A1 (herewith incorporated by reference, PHQ 86-015, U.S. patent application Ser. No. 079,542 filed July 29, 1987), or from the Applicant's prior but not duly published Patent Application 8,800,820 (herewith incorporated by reference, PHN 12.479, U.S. patent application Ser. No. 272,182, filed Nov. 16, 1988).

The first document describes a cassette having openings in both main walls, which openings can be closed by means of a slide which is movable over the exterior of the housing. When the cassette is inserted into an apparatus the cassette slide is opened against spring force by cooperation with a part provided in the apparatus. The two openings are then freely accessible to allow the passage of a pick-up to the disc surface. The openings in the main walls take the form of rectangular slots which are symmetrical relative to a radius of the disc. Consequently, the openings cannot be wider than maximum one third of the width of the cassette.

In practice, it is found that even such a wide opening is not always adequate. In principle, optical discs are read by means of two types of optical devices, namely translating devices or pivoting devices. In order to preclude problems in reading the optical information of the disc pick-ups in translating devices are preferably moved over the disc, surface in such a way that the read objective moves along a radius of the disc. The objective is suspended so as to be movable in some extent both in the focusing direction and along the disc radius, which requires a suspension construction which generally has a shape which is asymmetrical relative to the disc radius. The known objectives must be disposed at a very small distance from the disc, so that until now it has been necessary to bring the entire pick-up, i.e. including the suspension construction, in the proximity of the disc surface and hence into the opening in the main wall of the cassette. In the case of pivotal optical devices the objective follows a curved path whose centre is the pivotal centre of the device. The curved path should be so as to minimise angular errors occurring during reading. As is generally known from the technology of pick-up arms for scanning gramophone discs, this results in the curved path not being symmetrical relative to a disc radius but subtends at a specific angle relative to the radius at any point. Further information relating to the path of an optical pivotal arm can be found in U.S. Patent Specification U.S. Pat. No. 4,403,316 (herewith incorporated by reference, PHN 10.134).

The earlier mentioned prior but not duly published document describes a cassette which also has openings in both main walls, the openings having a larger width than those of the prior-art cassette already discussed. Again the openings of the cassette are closed, in the present case by means of two slides which are movable in opposite directions. The use of two oppositely movable slides enables the openings to be given a width substantially equal to half the width of the cassette.

Whereas the opening in the main wall of the cassette known from the first document is rather narrow for many uses, the opening in the cassette known from the second document is generally large enough. This advantage of a larger opening and hence a wider field of use for the cassette, however, is obtained at the expense of some new drawbacks. The larger openings in the main walls weaken the construction of the cassette. If slides are used more parts are needed than in the first mentioned cassette. Moreover, in the apparatus to be used in conjunction with the cassette more parts are necessary for opening the two slides, so that more space is needed. The narrow-elongate shape of the slides may give rise to slanting effects, which may impair a correct opening and closure of the slides.

SUMMARY OF THE INVENTION

It is an object of the invention to provide a cassette of which does not have the drawbacks of the prior-art cassettes, which combines an optimum rigidity of the housing with an optimum accessibility to the disc for different types of pick-ups, and which requires a minimal number of parts. To this end the invention includes a first opening having a shape which is asymmetrical relative to a radius of the disc perpendicular to the front wall.

The use of an asymmetrical opening surprisingly results in the effect that both for asymmetrically shaped translating pick-ups and pivotal pick-ups adequate space for access to the disc surface can be obtained with an opening of a width which is slightly smaller than one third of the width of the cassette. In apparatuses comprising a translating pick-up, the use of the cassette in accordance with the invention makes it necessary to allow for the orientation of the suspension construction of the pick-up relative to the disc radius. In this respect the cassette imposes a limitation on the freedom in designing the apparatus. However, in practice this limitation is not essential because for the construction of an apparatus it is irrelevant whether the suspension construction is situated at one side of the radius or at the other side of the radius. It is merely required that the designer of the apparatus knows in advance at which side the suspension construction is to be arranged.

Pivotal type optical pick-ups are frequently used in optical audio-disc players which read Compact Discs (CDs). Typically, the radius of the pivotal movement of the objective is approximately 30 mm. CDs have a radius of 60 mm or 40 mm. In cassettes in accordance with the invention containing discs of these diameters the customary pivotal devices can be employed without any problems.

A wide variety of embodiments are possible within the scope of the invention. A preferred embodiment of a cassette in accordance with the invention includes a first main wall has a second opening for giving a drive spindle of a drive arrangement access to the centre of the disc. The first opening is substantially the shape of a rectangle and the second opening is substantially circular. The width of the first opening is substantially equal to the diameter of the second opening, and the two openings partly overlap one another. The first opening is offset in a direction perpendicular to a radius parallel to the long sides of the rectangle.

It is known per se, for example from said two documents to render the centre of the disc also accessible from the exterior through openings in the main walls, so that the disc can be mounted directly on a spindle in a drive arrangement and can be pressed onto the spindle by means of a disc-pressure member which forms part of the apparatus. This does not require any provisions in the cassette itself, which contributes to a simple construction of the cassette and the use of a minimal number of parts. It is obvious that the central opening should be disposed symmetrically relative to a radius of the disc. If the two openings in the main wall of the cassette in accordance with the invention are suitably combined with each other and, moreover, the width of the first opening is made substantially equal to the diameter of the second opening this will yield a cassette in which the combined asymmetrical opening has a minimal width, so that the cassette construction is only weakened to a minimal extent.

In particular when magneto-optical discs are used an embodiment of the invention is of interest in which the second main wall is formed with a third opening situated opposite the first opening. The third opening has a shape which is symmetrical relative to a radius of the disc perpendicular to the front wall. The width of the third opening is at the most equal to the width of the first opening. When magneto-optical discs are used the third opening need not be as wide as the first opening and merely serves to provide access to the disc surface for a magnetic element. Currently it is envisaged that the magnetic elements to be used in magneto-optical players will have a substantially symmetrical shape. In order to minimise the area of the third opening it is therefore desirable that the opening is situated symmetrically in the cassette.

A further embodiment of the invention is characterized in that the cassette comprises a slide which is movable over the first main wall between a closed position, in which the first opening is covered, and an open position, in which the first opening is freely accessible from the exterior. At one side the slide has an asymmetrical profile adapted to the asymmetrical shape of the first opening.

This embodiment of the invention provides a cassette comprising a slide whose dimensions can be minimal because the slide is adapted to the asymmetrical opening in the main wall of the cassette in such a way that this opening is fully exposed when the slide is open.

The cassette in accordance with the invention can be utilised advantageously with a slide or without a slide. If no slide is used it is obvious that the disc is less effectively protected against dust and other extraneous influences. However, this also means that the reproducing apparatus does not require any provisions for opening a slide and the cassette is less expensive. The use of cassettes without a slide is therefore of particular interest in those cases where a very good protection of the disc is of less importance and a simple construction of the apparatus and of the cassette are more important. This applies in particular to the use of CDs in CD players mounted in the dashboard of a car. In view of the limited mounting space it is important to minimise the number of additional parts in the player. In a car the cassette should provide a certain degree of protection for the CD to enable the CD to be handled more conveniently while driving, but the CD need not be better protected against dust than normally. As a consumer product the cassette should preferably be inexpensive. For many other uses, for example in the professional field, however, a better protection of the disc is very desirable.

For cassettes of the aforementioned type whose second main wall is also formed with an opening a further embodiment of the invention is of interest, which is characterized in that in the closed position the slide covers both the first and the second opening and in that at one side the slide has a profile adapted both to the asymmetrical shape of the first opening and to the second opening, so that in the open position of the slide the second opening is also freely accessible from the exterior.

By correctly adapting the profile of the slide only a minimal displacement is necessary to expose both openings completely, so that no useful area is lost.

A further embodiment of the invention is characterized in that near the first opening the housing of the cassette has a partly truncated corner adapted to cooperate with means of an apparatus to preclude misinsertion of the cassette, and in that the partly truncated corner is situated at that side of the first opening towards which the slide is moved during its movement to the closed position.

In many cases it is important that misinsertion of the cassette into the apparatus is prevented by providing an apparatus with means adapted to cooperate with parts of the cassette. The present embodiment of the invention ensures that no problems arise due to the slide covering parts of the cassette which cooperate with parts of the apparatus in order to preclude misinsertion.

A further embodiment of the invention, which is of interest for cassette having openings in both main walls, is characterized in that the slide is also movable over the second main wall and in the open position exposes the third opening to provide access from the exterior.

DESCRIPTION OF THE EMBODIMENTS SHOWN IN THE DRAWINGS

Figure 1:
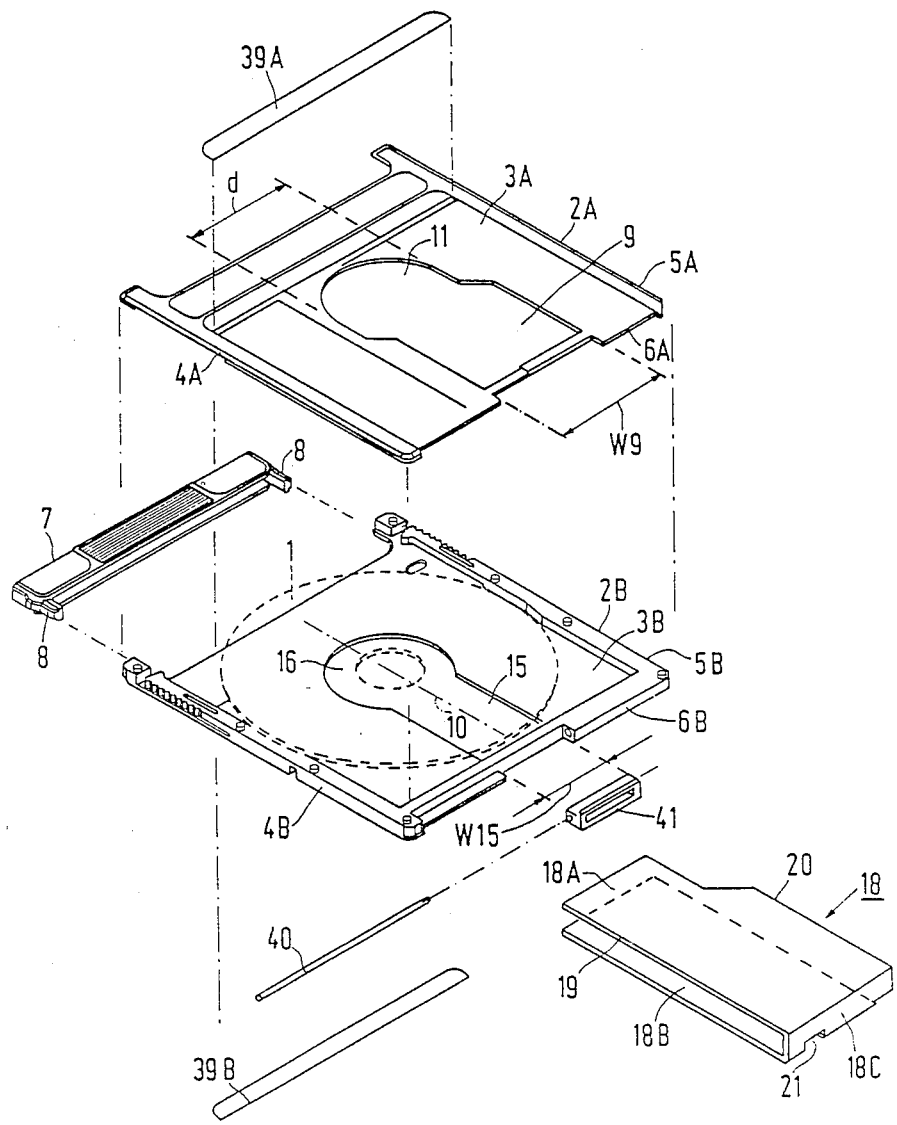
FIG. 1 is an exploded view of a first embodiment of the cassette in accordance with the invention.

FIG. 1 shows a cassette with a rotatable information disc 1 whose information is readable by means of a pick-up which moves parallel to the disc surface and which forms part of a read apparatus. Only the outline of the disc is shown in broken lines. The pick-up needed for reading the information of the disc is not shown in the drawing. Neither the disc itself nor the pick-up are of any further relevance to the invention.

The cassette comprises a housing consisting of two shells 2A and 2B, which are permanently secured to one another. The shells comprise first and second main walls 3A and 3B parallel to the information disc. Moreover, side walls 4A, 4B and 5A, 5B are provided as well as a front wall 6A, 6B and a rear wall 7. The entire rear wall 7 is removable to replace the disc in the cassette. For further details on the use of a rear cassette wall which can be opened to replace the disc reference is made to the aforementioned Patent Application 8,800,820 (PHN 12.479). It is to be noted only that the wall 7 can be snapped onto the remainder of the cassette housing by means of projections 8. Together the walls bound a disc-receiving space in which the disc is arranged to be rotatable. The first main wall 3A is formed with a first opening 9 to give a pick-up access to the disc surface.

The opening 9 has an asymmetrical shape relative to a radius 10 of the disc 1 which is perpendicular to the front wall 6.

Figure 4:
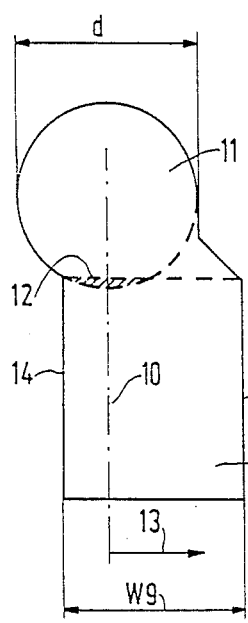
FIG. 4 is a diagrammatic plan view of the openings in the first main wall of the cassette.

The first main wall 3A also has a second opening 11, which serves to give a drive spindle of a drive arrangement access to the centre of the disc 1. The first opening 9 is of substantially rectangular shape and the second opening 11 is circular. The width W9 of the first opening is substantially equal to the diameter d of the second opening. For the sake of clarity the outlines of the two openings are again indicated in FIG. 4. Both openings partly overlap one another in the shaded area 12 in FIG. 4. The first opening 9 is offset in the direction 13 perpendicular to the radius 10 which extends parallel to the long sides 14 of the opening 9.

Figure 5:
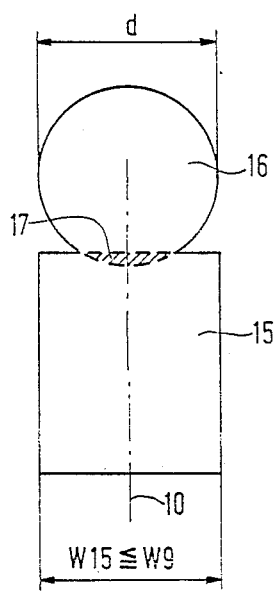
FIG. 5 is a view similar to that of FIG. 4, showing the openings in the second main wall of the cassette.

The second main wall 3B is formed with a third opening 15, which is situated opposite the first opening 9 in the first main wall. The third opening 15 has a shape which is symmetrical relative to the radius 10 of the disc. Its width W15 is substantially equal to the width W9 of the first opening but may also be smaller. The second main wall 3B is formed with a fourth opening 16 which, like the second opening 11, is circular and has the same diameter d. For the sake of clarity FIG. 5 shows the combination of the third and the fourth opening. These two openings overlap one another in an area 17.

The cassette comprises a slide 18. This slide is movable over the outer side of the first main wall 3A between a closed position—see FIG. 2—in which the first opening 9 is covered and an open position—see FIG. 3—in which the first opening is freely accessible from the exterior. At one side the slide has a profile 19 which corresponds to that of the nearest side 4 of the housing. The other side has an asymmetrical profile 20 adapted to the asymmetrical shape of the first opening 9.

The slide 18 comprises two portions 18A and 18B which are movable over the first and over the second main wall respectively. The two parts are interconnected by a connecting portion 18C at the front of the cassette. This connecting portion has an opening 21 for actuating the slide by means provided in a read apparatus. In the closed position the slide closes both the first opening 9 and the second opening 11. The profile 20 at the other side of the slide is adapted both to the asymmetrical shape of the first opening and also to that of the second opening 11. Thus in the open position of the slide 18, see FIG. 3, the second opening 11 is also freely accessible from the exterior. In other words, the profile 20 has such a shape that in the closed position both opening are covered and in the open position both openings are freely accessible. This is possible because both openings have the same width, so that only a minimal travel of the slide is required or, in other words, a maximum useful area is exposed with a specific stroke of the slide.

Near the first opening 9 the cassette housing has a truncated corner 22 which is adapted to cooperate with means provided in an apparatus to prevent misinsertion of the cassette into the apparatus. The truncated corner is situated at that side of the first opening 9 towards which the slide 18 is moved during during closure of the slide. Thus, the truncated corner cannot in any way be covered by the slide.

With its portion 18B the slide 18 also moves over the second main wall 3B and in the closed position it closes the third opening 15 and the fourth opening 16. In the open position it exposes them to provide free access from the exterior. As the first opening and up to and including the fourth opening all have the same transverse dimension when the free area is as large as possible, the four openings are completely exposed at the same time to give free access to the disc with a minimum travel of the slide.

Figure 2:
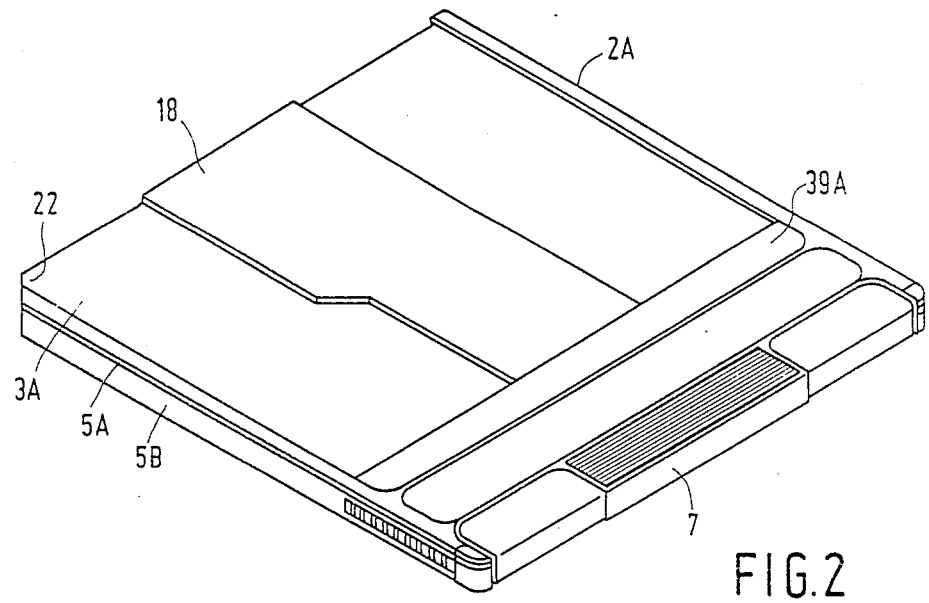
FIG. 2 shows the cassette of FIG. 1 with a closed asymmetrical slide in a perspective view to a slightly enlarged scale.
Figure 3:
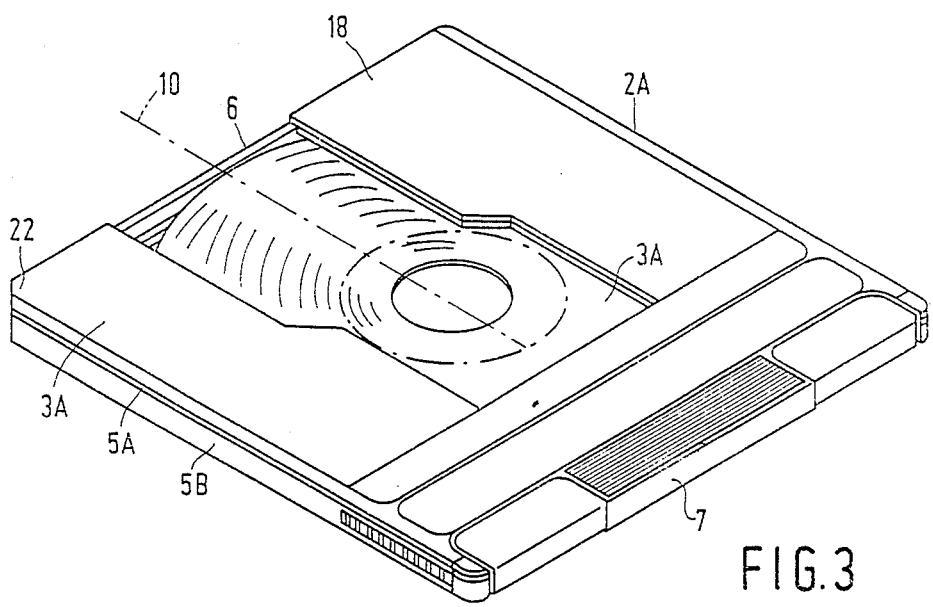
FIG. 3 is a perspective view as shown in FIG. 2, but now with the slide in the open position.
Figure 6:
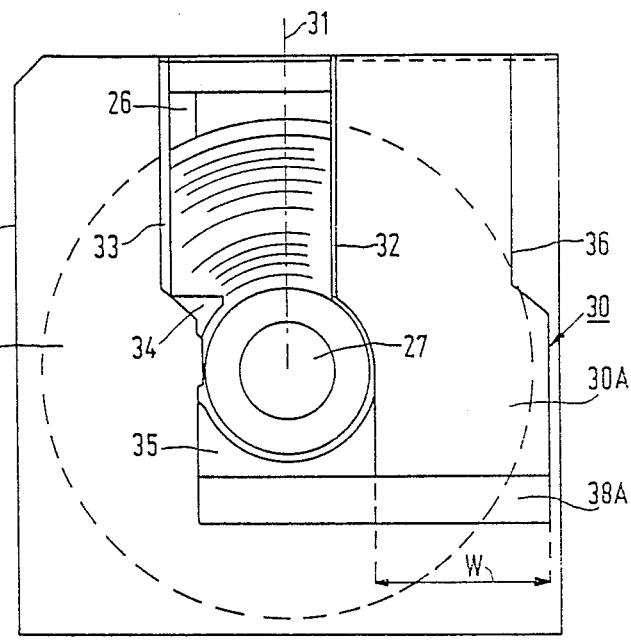
FIG. 6 is an underneath view of a cassette in a modified embodiment, comprising an open asymmetrical slide.
Figure 7:
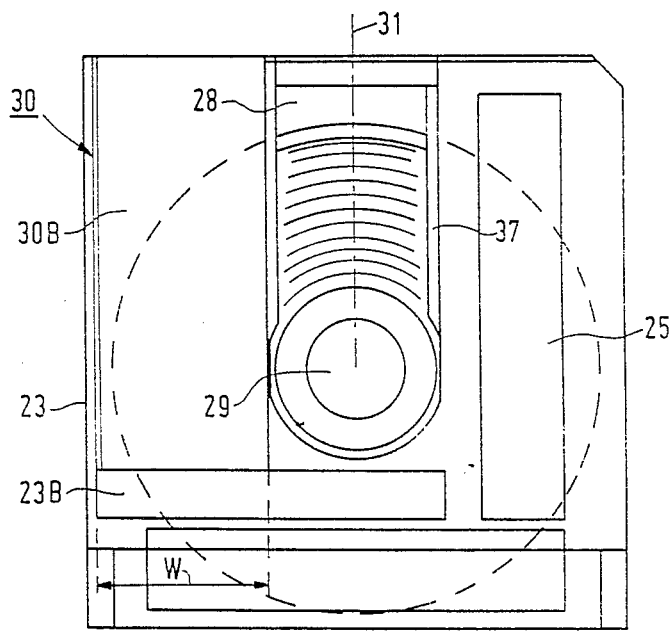
FIG. 7 is a plan view of the cassette shown in FIG. 6.

FIGS. 6 and 7 relate to a cassette which differs only in a few respects from that shown in FIGS. 1 to 3. Therefore, the second embodiment will be described only briefly. The housing 23 of the cassette has a first main wall 24 and a second main wall 25. The first main wall is formed with a first opening 26 and a second opening 27, and the second main wall is formed with a third opening 28 and a fourth opening 29. The slide 30 comprises portions 30A and 30B, which slide over the first and the second main wall respectively. The first opening 26 and the third opening 28 are of rectangular shape. Their longitudinal directions extend in the same direction as the radius 31. The profile 32 at one side of the portion 30A of the slide 30 is adapted to the asymmetrical position of the first opening 26 and to the circular third opening 27. In the closed position the portion 30A engages with rebates 33, 34 and 35 formed in the first main wall 24. At the other side the portion 30A of the slide 30 has a profile 36 of the same shape as a profile 32, so that the portion 30A has the same width W over its entire length. The portion 30B of the slide at the other side of the cassette has the same width. A rebate 37 is provided to engage with the portion 30B in the closed position.

For a satisfactory guidance of the slide on the cassette, cover plates 38A and 38B are arranged at opposite sides of the cassette, underneath which plates the free ends of the portions 30A and 30B of the slide can move with clearance.

The first embodiment of the cassette shown in FIGS. 1 to 3 also comprises similar cover plates 39A and 39B. FIG. 1 also shows some parts provided for guiding the slide 18 on the cassette. These parts comprise a pin 40 and a guide block 41. This block is connected to the wall 18C of the slide 18 in a manner not shown, for example by means of an adhesive, and is slidably mounted on the pin 40. The drawings do not show the resilient means for urging slide towards the closed position. These resilient means may comprise, for example, a helical spring arranged around the pin 40 and acting against the side wall 4B of the cassette at one end and against the guide block 41 at the other end.

Within the scope of the invention many modified embodiments are possible which nevertheless utilise the basic idea of the invention, namely the use of an asymmetrical opening in the cassette in order to obtain a wide field of use for the cassette with a minimal area of the opening by making the cassette suitable for cooperation with various types of pick-ups of drive apparatuses. A comparison of the cassette in accordance with the invention with other prior art cassette not yet considered may reveal further advantages of the cassette in accordance with the invention. Apart from an optical disc the cassette may contain any other type of disc, such as a magnetic disc, a magneto-optical disc, a disc formed with surface grooves etc.

What is claimed is:

1. A cassette comprising a rotatable information disc whose information is readable by means of a pick-up which moves parallel to the disc surface and which forms part of an apparatus, a housing comprising first and second main walls parallel to the disc, side walls, a front wall, and a rear wall, which walls together bound a disc-receiving space in which the disc is rotatable, the first main wall being formed with a first opening to give a pick-up access to the disc surface, the first opening having a shape which is asymmetrical relative to a radius of the disc perpendicular to the front wall, a second opening in the first main wall for giving a drive spindle of a drive arrangement access to the center of the disc, the first opening having at least substantially the shape of a rectangle and the second opening being at least substantially circular, the width of the first opening being substantially equal to the diameter of the second opening, the two openings partly overlapping one another, and the first opening being offset in a direction perpendicular to a radius parallel to the long sides of the rectangle.

2. A cassette according to claim 1 wherein said bottom includes a third opening having a central axis coincident with said second opening central axis.

3. A cassette as claimed in claim 1 wherein the second main wall is formed with a third opening situated opposite the first opening, the third opening has a shape which is symmetrical relative to a radius of the disc perpendicular to the front wall, and the width of the third opening is at the most equal is at the most equal to the width of the first opening.

4. A cassette as claimed in claim 1, wherein the cassette comprises a slide which is movable over the first main wall between a closed position, in which the first opening is covered, and an open position, in which the first opening is freely accessible from the exterior, and at one side the slide has an asymmetrical profile adapted to the asymmetrical shape of the first opening.

5. A cassette as claimed in claim 4, wherein in the closed position the slide covers both the first and the second opening, and at one side the slide has a profile adapted both to the asymmetrical shape of the first opening and to the second opening, so that in the open position of the slide the second opening is also freely accessible from the exterior.

6. A cassette as claimed in claim 1 or 4, wherein near the first opening the housing of the cassette has a truncated corner adapted to cooperate with means of an apparatus to preclude misinsertion of the cassette, and the truncated corner is situated at that side of the first opening towards which the slide is moved during its movement to the closed position.

7. A cassette as claimed in claim 4, wherein the slide is also movable over the second main wall and in the open position exposes the third opening to provide access from the exterior.

8. A cassette for holding a rotatable information disc which is read by means of a pickup which moves parallel to the disc surface during rotation of the disc about an axis of rotation thereof, comprising:
a substantially rectangular housing having front and rear edges and an axis extending there-between which intersects said rotational axis of said disc, said housing having planar top and bottom surfaces, said top surface having a first substantially rectangular opening therein which extends from near said front edge of said housing toward said rotational axis, said rectangular opening having a major longitudinal axis which is offset from and parallel to said housing axis, said top surface further having a second opening therein having a central axis coincident with said rotational axis, said second opening partially intersecting said first opening; and,
a slidable cover supported on said top surface for covering and uncovering said first and second openings, whereby said first opening permits access of a read pickup to said disc surface and said second opening permits access of a spindle drive to said information disc.

9. The cassette of claim 8 wherein said cover has first and second portions each having a shape symmetrical with said first and second openings.

10. The cassette of claim 8 wherein said second opening is substantially cylindrical.

11. The cassette of claim 8 wherein said first and second openings have substantially the same width.

12. A cassette for holding a rotatable information disc, comprising:
a rectangular housing having planar top and bottom surfaces connected at front and rear edges and a pair of side edges thereof; said housing supporting said disc for rotation about a central axis of said information disc, said top surface having a first substantially rectangular opening therein extending from near said front edge towards said central axis, said rectangular opening having a major longitudinal axis which is offset from an axis of said housing which intersects said central axis and perpendicularly intersects said front edge, said top surface further having a second opening therein centered about said central axis and which partially intersects said first opening; and
a cover supported for sliding movement of said top surface between a covering position over said first and second openings preventing access to said disc and an open position exposing said disc through said first and second openings.

13. The cassette of claim 12 comprising a third opening on said bottom surface having a central axis coincident with said rotational axis and a second cover connected to slide with said first cover so as to provide covering and uncovering of said third opening.

* * * * *